United States Patent [19]

Jones et al.

[11] 4,435,095

[45] Mar. 6, 1984

[54] HOT TUB THERMOMETER

[75] Inventors: James B. Jones, 913 Howard St., Venice, Calif. 90291; Ron B. Soyka, Woodland Hills, Calif.

[73] Assignee: James B. Jones, Woodland Hills, Calif.

[21] Appl. No.: 343,913

[22] Filed: Jan. 29, 1982

[51] Int. Cl.³ ............................ F21V 33/00; F21K 1/14
[52] U.S. Cl. ...................................... 374/194; 116/216; 362/101; 362/802; 374/208
[58] Field of Search ............... 374/190, 194, 105, 208; 200/60, 184, 183; 362/23, DIG. 802, 253, 101

[56] References Cited

U.S. PATENT DOCUMENTS

| | | | |
|---|---|---|---|
| 1,103,605 | 7/1914 | Moeller | 362/23 X |
| 2,167,109 | 7/1939 | Goldin | 362/23 |
| 2,761,057 | 8/1956 | Modell | 374/191 |
| 2,787,937 | 4/1957 | Prisament | 374/191 X |
| 3,105,233 | 9/1963 | D'Amore et al. | 200/60 X |
| 4,390,928 | 6/1983 | Runge | 362/101 |

FOREIGN PATENT DOCUMENTS 53-62572 6/1978 Japan ................................ 200/184

Primary Examiner—Daniel M. Yasich
Attorney, Agent, or Firm—Harris, Kern, Wallen & Tinsley

[57] ABSTRACT

A thermometer suitable for a hot tub, spa, pool, and the like, and including a temperature sensor and indicator and a light source so the indicator can be read at night or in dim light. A tubular configuration which hangs upside down in the water when measuring temperature, and which is manually turned upright for reading, with an orientation sensitive power supply for energizing the bulb when in the upright position. A battery operated power supply which is permanently off or open circuited during shipping and storage and which is activated by the user by simply ramming the cap down on the unit to electrically bridge an open circuit in the lamp supply circuit.

4 Claims, 4 Drawing Figures

U.S. Patent Mar. 6, 1984 4,435,095
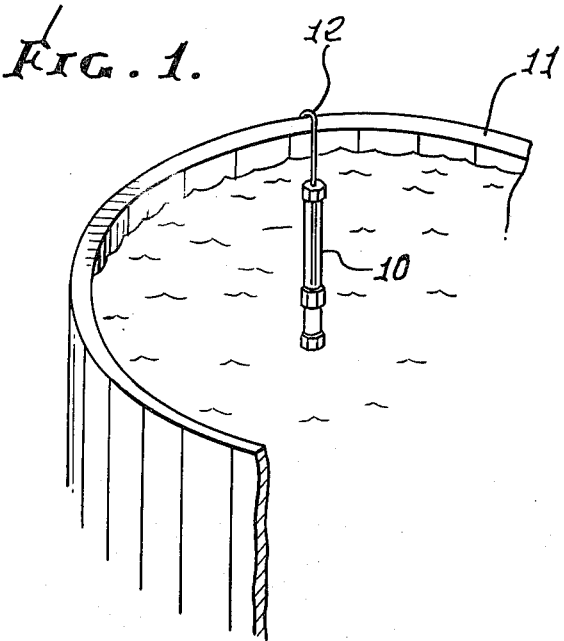
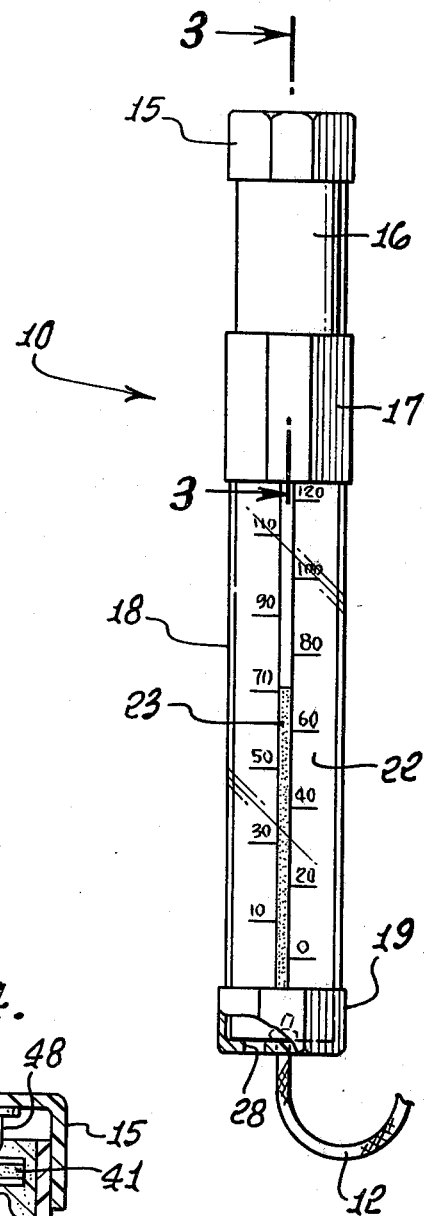
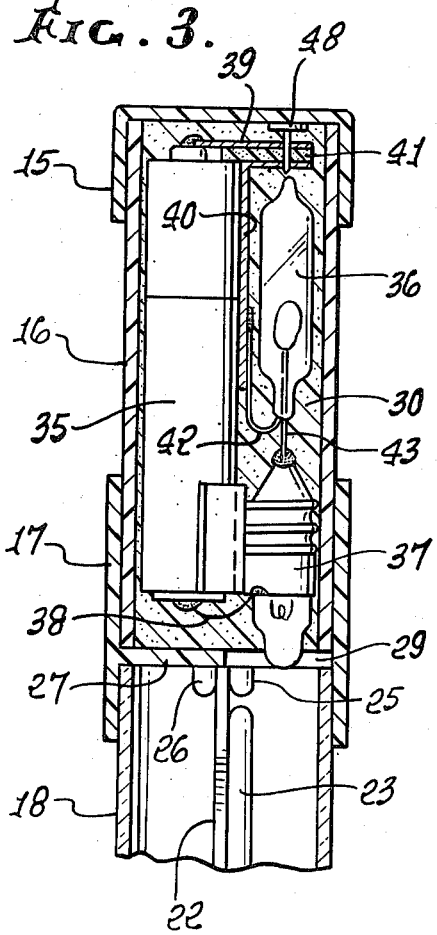
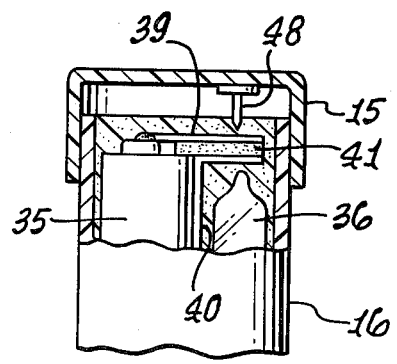

HOT TUB THERMOMETER

BACKGROUND OF THE INVENTION

This invention relates to a thermometer suitable for use with hot tubs, spas, pools and the like, and in particular to a new and improved thermometer with an electrically illuminated temperature indicator energized from a battery power supply integral with the thermometer.

Hot tubs and the like are in wide use today and may be operated at various elevated temperatures. Prolonged exposure to water temperatures above safe levels can be hazardous to the health, and a conventional manner of determining the water temperature is by means of a thermometer hanging in the water with the user occasionally picking up the thermometer to read the temperature and appropriately adjust the heat supply.

However hot tubs and spas and the like often are utilized in the evening and at night when there is little or no light and reading of a thermometer is difficult or impossible.

It is an object of the present invention to provide a new and improved thermometer suitable for use in hot tubs and the like which can be used in daylight and in the dark. A further object is to provide such a thermometer with an integral power supply for a bulb for illuminating the temperature indicator.

It is an object of the invention to provide such a thermometer which operates at very low voltage and power, typically using a penlight size battery, to avoid any electrical hazard. At the same time, it is an object to provide such a thermometer which can have relatively long life both during shipping and storage and during use.

This is accomplished in the thermometer of the present invention by providing for manual activation of the thermometer to energize the lamp for a temperature reading, and providing for manual interconnection of the lamp and battery circuit at the time the thermometer is put into use.

These and other objects, advantages, features and results will more fully appear in the course of the following description.

SUMMARY OF THE INVENTION

A thermometer with a housing and means for supporting the housing in a hot tub or the like in a first orientation and with the housing being manually moveable to a second opposite orientation. A temperature sensor and indicator positioned within the housing and a light bulb carried in the housing for directing light onto the temperature indicator, with an orientation sensitive power supply for the light bulb for energizing the bulb when the housing is in the second orientation.

A thermometer with tubular housing sections interconnected by a sleeve, with the temperature sensor and indicator in one section and the power supply and light bulb in the other section, permitting replacement of the power supply when exhausted.

A thermometer with a battery and mercury switch in the power supply connected in series with the bulb. The series circuit includes a pair of electrically conducting plates with an insulating spacer therebetween, and an electrical conducting pin, with the cap being manually moveable on the housing to drive the pin through the plates and electrically bridge the plates when it is desired to place the thermometer in service. Prior to this bridging operation, the battery is isolated from the orientation sensitive switch and bulb so that the unit can be shipped and stored without energizing the bulb.

BRIEF DESCRIPTION OF THE DRAWING

FIG. 1 is a perspective view of a portion of a hot tub showing the presently preferred embodiment of the thermometer of the invention hanging therein;

FIG. 2 is a side view of the thermometer of FIG. 1;

FIG. 3 is an enlarged partial sectional view taken along the line 3—3 of FIG. 2, showing the electrical circuit in the operating condition; and FIG. 4 is a view similar to that of FIG. 3 showing the electrical circuit in the shipping and storage position.

DESCRIPTION OF THE PREFERRED EMBODIMENT

In FIG. 1, a thermometer 10 is suspended in the water of a hot tub 11 by a cord 12 affixed at one end to the rim of the tub and at the other end to the thermometer. The thermometer 10 is shown in the inverted or temperature measuring orientation in FIG. 1, and in the upright or temperature reading orientation in FIG. 2.

In the embodiment illustrated, the thermometer includes a housing with a cap 15, a tubular section 16, a sleeve 17, another tubular section 18, and a cap 19. Typically all the housing sections are formed of plastic.

A temperature indicator 22, typically a plastic card, is supported in the tubular section 18 between the sleeve 17 and cap 19, and a conventional temperature sensor 23 is carried on the indicator 22. A transverse slot is provided in the sleeve 17 between ribs 25, 26 carried on a transverse barrier 27. A similar slot or groove is provided in the cap 19, and the temperature indicator 22 is positioned in these two slots. The cord 12 passes through an opening in the cap 19 and is secured by a knot or otherwise as desired. Another opening 28 is provided in the cap 19 for air flow out as water flows into the interior of the tubular section 18 about the section 16 through inner grooves in the sleeve 17, and an opening 29 in the barrier 27.

The electrical circuitry is carried in the tubular section 16 and preferably after assembly, is potted within the section by conventional potting compound 30. This circuit preferably is a low voltage, low power circuit and typically includes a 1.5 volt penlight battery 35, a mercury switch 36, and a bulb 37. One terminal of the battery 35 is connected to the case of the lamp 37 by a conductor 38. The other terminal of the battery 35 is connected to a thin electrical conducting plate 39, typically a brass sheet 0.001 inches thick. Another similar brass plate 40 is bonded to an electrical insulating spacer 41 which in turn is bonded to the plate 39. One lead 42 of the mercury switch is connected to the plate 40, and the other lead 43 of the mercury switch is connected to the center terminal of the lamp 37.

The electrical circuit is manufactured as shown in FIG. 4, with the plates 39, 40 electrically insulated by the spacer 41. After the circuit has been assembled it is inserted in and potted in the tubular section 16. An electrical conducting pin 48 is positioned in potting compound aligned with the plates 39, 40, and the cap is positioned on the section 16 over the pin 48. However the cap is not pushed all the way down on the tubular section, remaining in the position shown in FIG. 4. With this configuration, there is an open circuit in the electrical circuit, regardless of the orientation of the mercury switch 36. This permits shipping and storage of the thermometer in any orientation without closing the circuit to the lamp and depleting the battery.

When the customer is ready to use the thermometer, the electrical circuit is activated by pushing the cap 15 all the way down on the section 16, to the position shown in FIG. 3. The electrical conducting pin 48 punches through the plate 39, the spacer 41, and the plate 40, electrically bridging the two plates. This may be accomplished by grasping the thermometer firmly in the hand with the cap 15 down and striking the cap sharply on a flat surface. The thermometer is now ready for use, as by hanging in the water as shown in FIG. 1. When the customer wishes to know the temperature of the water, he merely grasps the thermometer and turns it to the upright position as shown in FIGS. 2 and 3. The blob of mercury within the mercury switch 36 now closes the circuit between the two conductors within the switch, thereby completing the series circuit between the battery, the lamp and the switch. The lamp illuminates the indicator and the customer may read the temperature. Then the thermometer is replaced in the water in the inverted position, the blob of mercury in the mercury switch moves away from the two conductors within the switch, and the series circuit between battery and lamp is open. The entire thermometer normally is immersed in the water when in the inverted or temperature measuring orientation of FIG. 1. The lamp is not energized when the circuit is open.

In the embodiment illustrated, the tubular section 18 slides into the sleeve 17, and the cap 19 slides onto the section 18, providing a simple assembly. Similarly, the tubular section 16 slides into the sleeve 17, with the cap 15 sliding on the section 16. When the battery 35 is exhausted, the section 16 may be removed and discarded, and a new section 16 with fresh battery installed in its place.

The thermometer of the present invention provides for immediate measurement of hot tub water temperature both day and night using an integrated package without any external wiring or controls and operating at extremely low voltage and power so that there is no electrical hazard to the users. The lighting operation is automatic when the thermometer is lifted out of the water. The sealed electrical circuit with battery does not have a shipping or storage problem since the battery circuit may be activated by the user just prior to insertion in the water for the first time.

We claim:

1. In a thermometer for a hot tub or the like, the combination of:

a housing;
   means for supporting said housing in a hot tub or the like in a first orientation, with said housing being manually moveable to a second opposite orientation;
   a temperature sensor and indicator positioned within said housing;
   a light bulb carried in said housing for directing light onto said temperature indicator;
   an orientation sensitive power supply for said bulb for energizing said bulb when said housing is in said second orientation, said power supply including a battery and a mercury switch connected in series with said bulb;
   a cap on said housing adjacent said power supply; and
   a pair of electrical conducting plates with an insulating spacer therebetween, and an electrical conducting pin positioned at said plate,
   with said plates connected in series with said bulb, battery and switch, and
   with said cap moveable from a first position with said pin out of engagement with said pair of plates, to a second position with said pin punched through said plates and spacer electrically bridging said plates.

2. A thermometer as defined in claim 1 wherein said temperature indicator carries temperature legends, with said legends in an upright position when said housing is in said second orientation, and with said legends in an inverted position when said housing is in said first orientation.

3. A thermometer as defined in claim 1 wherein said housing includes first and second tubular sections joined by an intermediate sleeve,
   with said temperature sensor and indicator in said first section and said bulb and power supply in said second section,
   with said sections sliding into said sleeve, and
   with said sleeve having a transverse barrier with a first opening for light transmission from said bulb to said indicator.

4. A thermometer as defined in claim 3 with said sleeve transverse barrier having means defining a first slot, and
   including a first cap for the other end of said first tubular section with said cap having means defining a second slot,
   with said temperature indicator mounted in said first and second slots,
   said first cap having a second opening for water access into said first section about said temperature sensor.

* * * * *